(12) United States Patent
Calabro et al.

(10) Patent No.: US 10,944,440 B2
(45) Date of Patent: Mar. 9, 2021

(54) SYSTEM AND METHOD OF PROCESSING A RADIO FREQUENCY SIGNAL WITH A NEURAL NETWORK

(71) Applicant: BOOZ ALLEN HAMILTON INC., McLean, VA (US)

(72) Inventors: Michael Calabro, Alexandria, VA (US); Mehrnaz Mortazavi, Santa Monica, CA (US); Wade Leonard, Springfield, VA (US); Zachary Rohde, Los Angeles, CA (US); Alex Saunders, El Segundo, CA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 15/950,629

(22) Filed: Apr. 11, 2018

(65) Prior Publication Data

US 2019/0319658 A1  Oct. 17, 2019

(51) Int. Cl.
*G06N 3/08* (2006.01)
*H04B 1/16* (2006.01)
*H04B 1/04* (2006.01)

(52) U.S. Cl.
CPC .............. *H04B 1/16* (2013.01); *G06N 3/08* (2013.01); *H04B 1/04* (2013.01)

(58) Field of Classification Search
CPC ..... H04L 27/0012; H04B 1/04; H04B 1/0003; H04B 1/16; G06N 3/08; G06N 3/0454
See application file for complete search history.

(56) References Cited

U.S. PATENT DOCUMENTS

| | | | |
|---|---|---|---|
| 5,172,253 A | 12/1992 | Lynne | |
| 6,240,282 B1* | 5/2001 | Kleider | H04L 27/0012 375/285 |
| 6,282,529 B1* | 8/2001 | Neuneier | G06K 9/6256 706/15 |
| 7,711,273 B2* | 5/2010 | Koc | H04B 10/61 359/245 |
| 9,450,688 B1 | 9/2016 | Murphy | |
| 10,003,483 B1* | 6/2018 | Migliori | G06N 3/0454 |
| 2007/0206963 A1* | 9/2007 | Koc | H04B 10/61 398/202 |

(Continued)

FOREIGN PATENT DOCUMENTS

| | | |
|---|---|---|
| CN | 109375497 A | 2/2019 |
| RU | 2641269 C1 | 1/2018 |

OTHER PUBLICATIONS

Tim O'Shea, et al., "An Introduction to Deep Learning for the Physical Layer", Cornell University Library, arXiv:1702.00832v2, Jul. 11, 2017, pp. 1-13.

(Continued)

*Primary Examiner* — Vineeta S Panwalkar
(74) *Attorney, Agent, or Firm* — Buchanan Ingersoll & Rooney PC (57) ABSTRACT

A method of processing a radio frequency signal includes: receiving the radio frequency signal at an antenna of a receiver device; processing, by a radio frequency front-end device, the radio frequency signal; converting, by an analog-to-digital converter, the analog signal to a digital signal; receiving, by a neural network, the digital signal; and processing, by the neural network, the digital signal to produce an output.

15 Claims, 7 Drawing Sheets

(56) References Cited

U.S. PATENT DOCUMENTS

| | | |
|---|---|---|
| 2008/0037804 A1 | 2/2008 | Shmunk |
| 2008/0139213 A1* | 6/2008 | Coersmeier ............ H04W 88/10 |
| | | 455/450 |
| 2008/0144944 A1 | 6/2008 | Breed |
| 2014/0358526 A1 | 12/2014 | Abdelal et al. |
| 2015/0161522 A1* | 6/2015 | Saon .................... G06N 3/0454 |
| | | 706/12 |
| 2018/0091336 A1* | 3/2018 | Mody ............... H04M 1/72522 |
| 2018/0322389 A1* | 11/2018 | OShea ................. H04B 1/0003 |
| 2018/0367192 A1* | 12/2018 | OShea ................. H04B 7/0452 |
| 2019/0033447 A1* | 1/2019 | Chan ....................... G01S 15/89 |

OTHER PUBLICATIONS

Timothy J. O'Shea, et al., "Convolutional Radio Modulation Recognition Networks", Cornell University Library, arXiv:1602.04105v3, Jul. 10, 2016, pp. 1-15.

Timothy J. O'Shea, et al., "Deep Learning-Based MIMO Communications", Cornell University Library, arXiv:1707.07980v1, Jul. 25, 2017, pp. 1-9.

Timothy J. O'Shea, et al., "Learning to Communicate: Channel Auto-encoders, Domain Specific Regularizers, and Attention", Cornell University Library, arXiv:1608.06409v1, Aug. 23, 2016, pp. 1-10.

Tim O'Shea, et al., "Radio Machine Learning Dataset Generation with GNU Radio", *Proceedings of the 6 th GNU Radio Conference*, Proceedings of the GNU Radio Conference, v. 1, n. 1, Sep. 2016, pp. 1-6.

Timothy J. O'Shea, et al., "Radio Transformer Networks: Attention Models for Learning to Synchronize in Wireless Systems", Cornell University Library, arXiv:1605.00716v1, May 3, 2016, pp. 1-5.

Timothy J. O'Shea, et al., "Semi-Supervised Radio Signal Identification", Cornell University Library, arXiv:1611.00303v2, Jan. 17, 2017, pp. 1-5.

Timothy J. O'Shea, et al., "Unsupervised Representation Learning of Structured Radio Communication Signals", Cornell University Library, arXiv:1604.07078v1, Apr. 24, 2016, pp. 1-5.

Nathan E. West, et al., "Deep Architectures for Modulation Recognition", Cornell University Library, arXiv:1703.09197v1, Mar. 27, 2017, pp. 1-7.

International Search Report and Written Opinion of the International Searching Authority (Forms PCT/ISA/220, PCT/ISA/210 and PCT/ISA/237) dated Aug. 9, 2019, by the International Bureau of United States Patent and Trademark Office in corresponding International Application No. PCT/US19/26926. (14 pages).

* cited by examiner

SYSTEM AND METHOD OF PROCESSING A RADIO FREQUENCY SIGNAL WITH A NEURAL NETWORK

FIELD

The present disclosure relates to processing a radio frequency signal with a receiver device including a trained neural network.

BACKGROUND INFORMATION

Existing wireless receivers suffer from interoperability problems. Often it is desirable for multiple radios built by different vendors and using different physical and access control radio technologies to interoperate, but it is complicated for any single radio to host all the processing required to process all other waveforms.

A paper entitled "An Introduction to Deep Learning for the Physical Layer," Jul. 11, 2017, Cornell University Library, arXiv:1702.00832v2, pages 1-13, by O'shea et al. describes several applications of deep learning for the physical layer. This paper also describes that radio transformer networks can be a means to incorporate expert domain knowledge in a machine learning (ML) model. It further describes the application or convolutional neural networks on raw IQ samples for modulation classification.

A paper entitled "Learning to Communicate: Channel Auto-encoders, Domain Specific Regularizers, and Attention," Aug. 23, 2016, Cornell University Library, arXiv:1608.06409v1, pages 1-10, by O'shea et al. describes reconstruction optimization through impairment layers in a channel autoencoder and several domain-specific regularizing layers to emulate common channel impairments.

A paper entitled "Radio Transformer Networks: Attention Models for Learning to Synchronize in Wireless Systems," May 3, 2016, Cornell University Library, arXiv:1605.00716v1, pages 1-5, by O'shea et al. describes introducing learned attention models into the radio machine learning domain for the task of modulation recognition by leveraging spatial transformer networks and introducing new radio domain appropriate transformations. This attention model allows the network to learn a localization network capable of synchronizing and normalizing a radio signal blindly with zero knowledge of the signal's structure based on optimization of the network for classification accuracy, sparse representation, and regularization.

A paper entitled "Convolutional Radio Modulation Recognition Networks," Feb. 12, 2016, Cornell University Library, arXiv:1602.04105v3, pages 1-15, by O'shea et al. describes the adaptation of convolutional neural networks to the complex-valued temporal radio signal domain.

A paper entitled "Unsupervised Representation Learning of Structured Radio Communication Signals," Apr. 24, 2016, Cornell University Library, arXiv:1604.07078v1, pages 1-5, by O'shea et al. describes unsupervised representation learning of radio communication signals in raw sampled time series representation.

A paper entitled "Deep Architectures of Modulation Recognition," Mar. 27, 2017, Cornell University Library, arXiv:1703.09197v1, pages 1-7, by West et al. describes applying machine learning with deep neural networks to the task of radio modulation recognition.

A paper entitled "Semi-Supervised Radio Signal Identification," Jan. 17, 2017, Cornell University Library, arXiv:1611.00303v2, pages 1-6, by O'Shea et al. describes that semi-supervised learning techniques can be used to scale learning beyond supervised datasets, allowing for discerning and recalling new radio signals by using sparse signal representations based on both unsupervised and supervised methods for nonlinear feature learning and clustering methods.

A paper entitled "Radio Machine Learning Dataset Generation with GNU Radio," Proceedings of the GNU Radio Conference, v. 1, n. 1, Sep. 2016, pages 1-6, by O'Shea et al. describes emerging applications of ML to the Radio Signal Processing domain.

A paper entitled "Deep Learning Based MIMO Communications," Jul. 25, 2017, Cornell University Library, arXiv:1707.07980v1, pages 1-9, by O'Shea et al. describes a physical layer scheme for single user Multiple-Input Multiple-Output (MIMO) communications based on unsupervised deep learning using an autoencoder.

SUMMARY

An exemplary embodiment of the present disclosure provides a method of processing a radio frequency signal. The method includes: receiving the radio frequency signal at an antenna of a receiver device; processing, by a radio frequency front-end device, the radio frequency signal; converting, by an analog-to-digital converter, the analog signal to a digital signal; receiving, by a neural network, the digital signal; and processing, by the neural network, the digital signal to produce an output.

An exemplary embodiment of the present disclosure provides a method of constructing and training a neural network to process a signal. The method includes: identifying a processing function to be performed on the signal by the neural network; determining, an optimum format for training vectors used to train the neural network; determining a number of layers of the neural network, number of nodes per layer, the node connectivity structure, and initial weights of the neural network; and inputting, into the neural network, a plurality of formatted training vectors in order to train the neural network to perform the processing function on the signal.

An exemplary embodiment of the present disclosure provides a receiver device configured to process a radio frequency signal. The receiver device includes: an antenna configured to receive the radio frequency signal; a radio frequency front-end device configured to process the radio frequency signal; an analog-to-digital converter configured to convert the analog signal to a digital signal; and a neural network configured to receive the digital signal and to process the digital signal to produce an output.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

The present disclosure is directed to a wireless communication signal receiver architecture that solves waveform interoperability problems and increases the flexibility of radio receivers. The present disclosure describes a signal processing technique to enable interoperable wireless communications. One or more signal processing blocks/devices in the receiver device are replaced with one or more neural networks. The replacement of the classical processing block/device 310 with the neural network 312 results in a receiver device with a simplified architecture relative to a receiver device with the classical processing block/device. For example, a receiver device with a neural network can have advantages in size, weight, and power (SWaP) over a conventional receiver. The present disclosure is also directed to a method of training of the neural network that is within the receiver device and/or a transmitter device.

Figure 1:
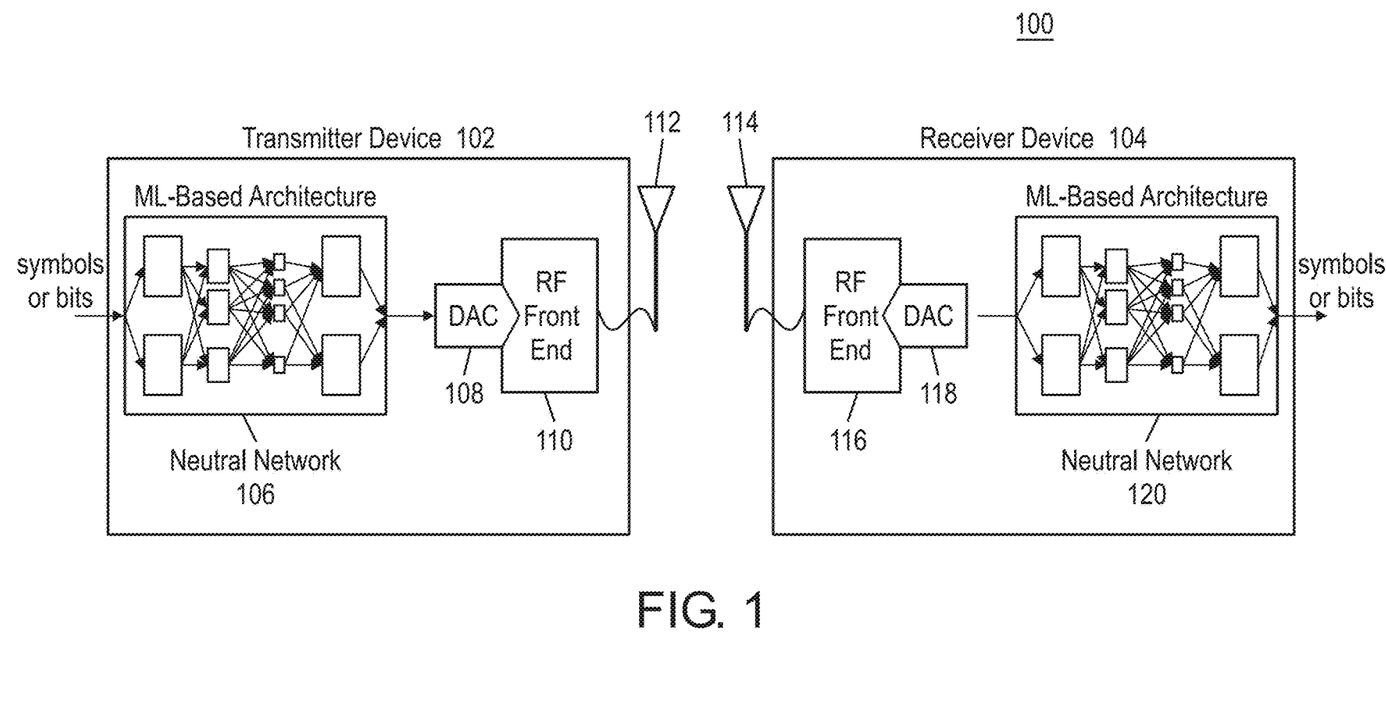
FIG. 1 illustrates a system architecture in accordance with an exemplary embodiment.

FIG. 1 illustrates a communications system architecture in accordance with an exemplary embodiment. The system 100 includes a transmitter device 102 and a receiver device 104.

In an exemplary embodiment, the receiver device 104 is configured to process an RF signal that is sent from the transmitter device 102. The receiver device 104 includes an antenna 114 that is configured to receive the RF signal sent from the transmitter device 102. The receiver device 104 can include a RF front-end device 116 that is configured to process the RF signal, and an analog-to-digital converter 118 configured to convert the analog RF signal to a digital signal. FIG. 1 shows that the RF front-end device 116 and the analog-to-digital converter 118 are located within the receiver device 104, but one or both of these components could be located outside of (i.e., external to) the receiver device 104 that contains the signal processing. The receiver device 104 includes a neural network 120 that is configured to receive the digital signal and to process the digital signal to produce an output. That is, the receiver device 104 applies transformations to the received digital signal (the signal output from the analog-to-digital converter 118) to recover the bits or symbols in the transmitted signal.

Figure 3A:
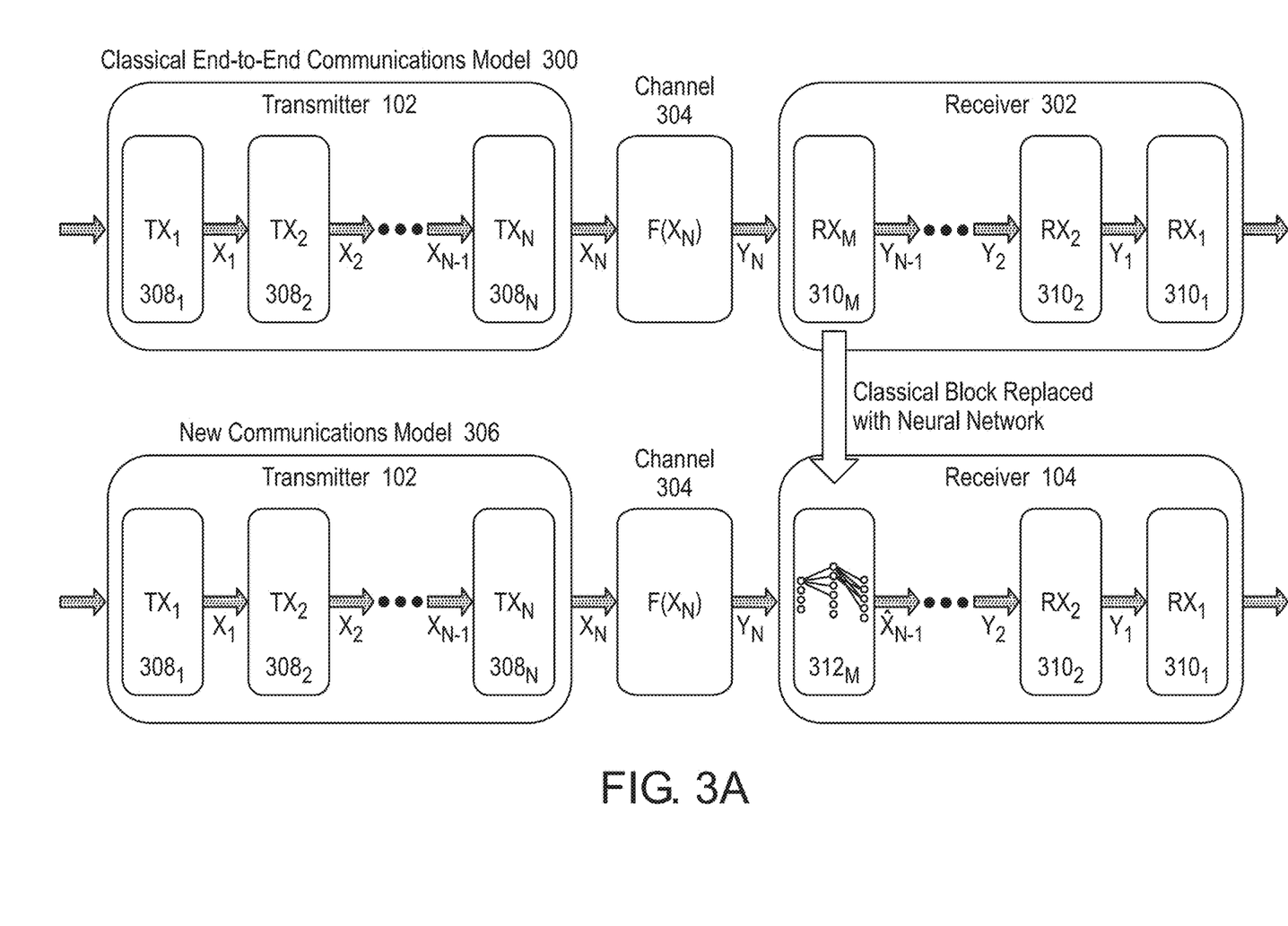
FIG. 3A illustrates an end-to-end communications system architecture.

The transmitter device 102 and the receiver device 104 can include a mixture of neural network based and classical communications processing blocks as shown in FIG. 3A. In an exemplary embodiment, signal processing components including timing recovery, frequency recovery, and demodulation have been replaced by the trained neural network 120 in the receiver device 104 to perform the functions of these signal processing components. Similarly, signal processing components including modulation and coding can be replaced by the trained neural network 106 in the transmitter device 102. As described later, this type of architecture has several novel applications and can enable new types of radio communications.

In an exemplary embodiment, the processing performed by the neural network 120 includes classifying a modulation scheme of the digital signal, and the digital signal is processed based on the determined classification of the modulation scheme. In an exemplary embodiment, the processing of the digital signal based on the determined classification of the modulation scheme can be performed by a classical signal processing component (i.e., a non-neural network component) or multiple classical signal processor components, or a different neural network. The modulation scheme of the digital signal can be Phase Shift Keying (PSK) modulation, Frequency Shift Keying modulation (FSK), Pulse Amplitude Modulation (PAM) modulation, Gaussian Minimum Shift Keying (GMSK) modulation, Continuous Phase Modulation (CPM), Quadrature Amplitude Modulation (QAM), or any other modulation scheme. In an exemplary embodiment, the neural network 208 is able to classify any of the above-noted modulation schemes.

In an exemplary embodiment, the RF signal received at the antenna 114 was generated by a neural network 106 in a transmitter device 102. The transmitter device 102 can also include a digital-to-analog converter 108 that performs digital-to-analog conversion and a RF front end device 110 that performs processing required after the DAC 108 and before RF transmission, to include, for example, frequency up-conversion, filtering, amplifying, etc. The transmitter device 102 also includes an antenna 112 for transmitting the RF signal to the receiver device 104.

In an exemplary embodiment, the received RF signal is any one type among two or more types of RF signals, and the classified modulation scheme of the digital signal is unique amongst the modulation schemes of the two or more RF signals. That is, the neural network 208 is able to receive one of any number of unique signal types, and classify the signal type. Under one example of a classical approach, if there are ten signal types, the received signal would be compared to the first signal type, then to the second signal type, then to the third signal type, and so on. Each signal type comparison requires its own unique signal processing operations. In contrast, in the receiver device 104 with the neural network 208 of the present disclosure, estimation of which of the ten signal types is received requires fewer processing cycles through a single common neural network.

Figure 2:
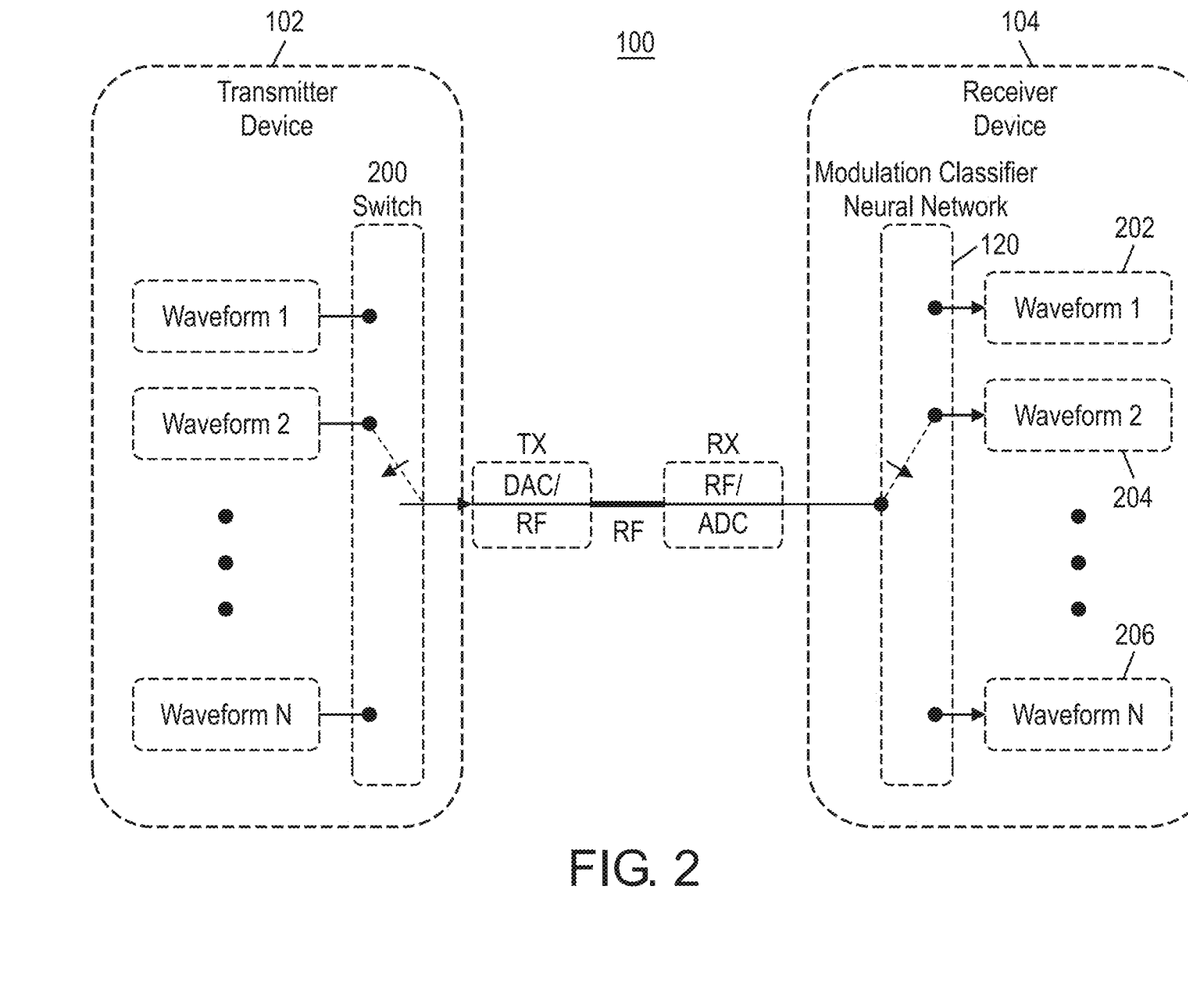
FIG. 2 illustrates a system hardware-in-the-loop architecture in accordance with an exemplary embodiment.

In an exemplary embodiment, the neural network 208 in FIG. 2 is trained to classify the digital signal. The waveform processing 202, 204, 206, is done conditionally based on the classification of the digital signal by the neural network 208.

In FIG. 1, the transmitter device 102 can be a ML-based transmitter in which a neural network 106 applies transformations to information bits or symbols to generate a digital signal for transmission through the channel (hardware+RF propagation). FIG. 1 shows the transmitter device 102 with a neural network 106; however the transmitter device 102 could be a traditional transmitter device that does not have a neural network.

FIG. 2 illustrates an ML-based receiver with a wireless modulation scheme classifier in the receiver device 104. Subsequent waveform processing in the receiver device 104 is performed based on the output of the modulation scheme classifier neural network 208. As necessary by application, the depth of the neural network can be extended to include one or more additional waveform processing steps, such as, synchronization, non-linear channel correction, waveform decoding, etc.

FIG. 2 illustrates the RF test architecture for the neural network 208 functioning as a modulation classifier. The system 100 of FIG. 2 includes the transmitter device 102 and the receiver device 104. The transmitter device 102 includes a transmitter switch 200 (e.g., a switch device) that selects one of N waveforms (e.g., Waveform 1, Waveform 2, . . . , Waveform N) for DAC/RF processing and transmission over the channel 304, where N can be any integer number. The neural network 208 is configured to classify the received signal as one of N possible signals. The received signal is then routed to the appropriate waveform processor (e.g., Waveform 1 Processor 202, Waveform 2 Processor 204, . . . , Waveform N Processor 206) based on the classification decision made by the neural network 208.

Applications that require processing large amounts of raw RF data at various degrees of fidelity benefit greatly from the signal processing techniques of the neural network 120 in FIG. 1. One example is a spectrum sensing application where the RF front-end device 116 samples over a wide bandwidth and is trying to separate, classify, and interpret signals of known or unknown type in that bandwidth. The processing technique of the present disclosure is scalable to large cloud-processing architectures and when large amounts of computing power are available, allows for efficient blind signal classification, separation, and interpretation. That is, in an exemplary embodiment, the neural network 120 in FIG. 1 could be located on a cloud computing environment instead of located on the receiver device 104.

FIG. 3A illustrates two communications system architectures. The upper architecture is of a classical end-to-end communications system model 300, and the lower architecture is of a communications system model 306 according to an exemplary embodiment of the present disclosure. This figure provides a general overview of a ML-based communication system in accordance with the present disclosure. In FIG. 3A, the transmitter device 102 consists of N distinct transmit processing blocks $308_1$, $308_2$, . . . , $308_N$, each performing a distinct function to transform its input. These transmit processing blocks $308_1$, $308_2$, . . . , $308_N$ collectively transform the raw input bits to a digital signal for transmission through the channel 304. The channel 304 represents the effects of hardware and RF propagation through a transmission medium. The representing function ($F(X_N)$) can vary depending on the channel type. A receiver device 302 consists of M distinct functional receive processing blocks $310_M$, . . . , $310_2$, $310_1$, each performing a distinct function to transform its input. The functional receive processing blocks $310_M$, . . . , $310_2$, $310_1$ collectively transform the received digital signal and recover the transmitted raw bits. In general, each receive processing block has a corresponding transmit processing block, with the receive processing block performing the inverse of the transmit processing block function. In FIG. 3A, M=N and thus the number of functional blocks in the transmitter device 102 and the receiver device 302 match. However, M does not have to equal N.

The exemplary end-to-end communications system 306 shown in the lower half of FIG. 3A includes the transmitter device 102, the channel 304, and the receiver device 104. In this example, one receiver block $310_M$ in the classical receiver device 302 is replaced by a neural network $312_M$. The neural network $312_M$ is trained to generate at its output (i.e., $\hat{X}_{N-1}$) the input of the corresponding block in the transmitter (i.e., $X_{N-1}$). Multiple receive processing blocks in the receiver 302 can be replaced by a neural network in the same fashion. The process of training the neural network to perform its expected function in the end-to-end communications system is described in FIG. 3B. Replacing either elements of, or the entire, receiver digital signal processing chain with a trained neural network simplifies the communications receiver architecture.

Figure 3B:
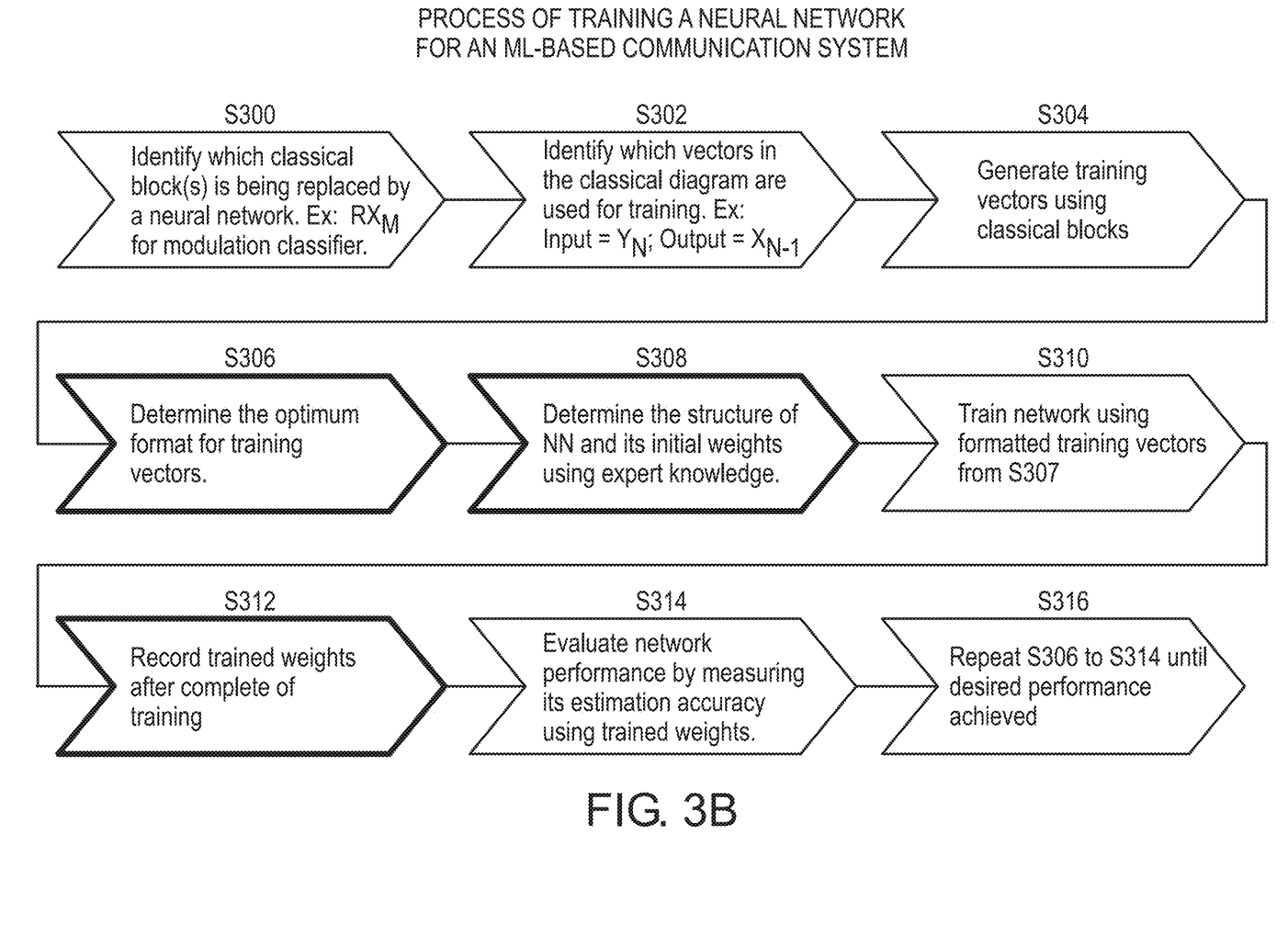
FIG. 3B is a flow chart illustrating a method according to an exemplary embodiment.

FIG. 3B illustrates a process of training a neural network (e.g., neural network 120) for the ML-based communication system of the present disclosure. In step S300, the classical block(s) that is being replaced by a neural network is identified. For example, $RX_M$ (block $310_M$) for a modulation classifier in FIG. 3A. In step S302, vectors in the classical diagram that are used for training the neural network are identified (e.g., input=$Y_N$; output=$X_{N-1}$). In step S304, training vectors are generated using classical signal processing blocks. In step S306, the optimum format for training vectors is determined. For example, the format could be two-dimensional (2-D) constellation points with resolution dictated by the amount/type of channel distortion. Step S308 includes determining the structure of the neural network and its initial weights using, for example, expert knowledge. For example, a two-layer model of the neural network can be used to identify modulation based on a 2-D constellation input (See FIG. 4). The first layer (e.g., Layer 1 in FIG. 4) identifies centers of mass on the constellation plot and the second layer (e.g., Layer 2 in FIG. 4) identifies the modulation based on the combination of identified centers of mass. For example, for the number of neurons per layer, the number of neurons in the first layer can be greater than the expected number of distinct centers of mass. In an exemplary embodiment, the number of neurons in the second layer is equal to the number of modulations to be classified.

Step S310 includes training the neural network using formatted training vectors from Step S306. Step S312 includes recording the trained weights after completion of the training. Step S314 includes evaluating neural network performance by measuring its estimation accuracy using the trained weights. Step S316 includes repeating steps S306 to S314 until the desired performance is achieved.

In an exemplary embodiment, the neural network 120 is trained on vectors of raw or processed bits, with or without channel effects, depending on the extent of the neural network in the transmitter device 102 and receiver device 104. As an example, if the neural network role is limited to a modulation classifier in the receiver device 102, the training vector can consist of modulated data corrupted by additive white Gaussian noise and other distortions applicable to the desired communications channel. After training, the neural network 120 can identify an unclassified signal that has gone through a communications channel 304 with similar characteristics. These training vectors are generated by classical transmit models where information bits are redundantly encoded, modulated, and then corrupted by a channel model (e.g., $F(X_N)$ in FIG. 3A).

Once properly trained, a neural network can be deployed to the edge of a communications system into a SWaP-constrained receiver device 104. In this scenario, the neural network training is performed on a separate platform than the platform onto which the neural network will be deployed. For example, the neural network training process is performed on a system without computational constraints and with access to ample training data sets. The neural network is then deployed onto a SWaP-constrained receiver device for operational use. This allows for a reprogrammable neural network to be deployed into a common embedded hardware device 104. For example, a small battery-powered embedded radio receiver running an ARM processor and a wideband RF front-end device can host a single neural network of a given depth, width, and height. That is, the neural network can be trained by a cloud computing device or other computing device with a lot of processing power, and then the neural network can be stored on the receiver device 104 and/or the transmitter device 102, which have less processing power than the device that trained the neural network. For example, the computing device storing and running the neural network 106 could be a software-defined radio (for example, an Ettus USRP e310, etc.), and the computing device storing and running the neural network 120 could be a software-defined radio. The receiver device 104 is software configurable subject to the performance constraints dictated by its SWaP. Multiple neural networks can be constructed, trained, and optimized off-platform for numerous applications. Example applications that would require different neural network designs include signal classification, a multi-waveform receiver, and a receiver optimized to process a single waveform in a variety of channel models. In this approach, the application-specific neural network would be deployed to the embedded device as prescribed by the embedded device's use case.

Figure 4:
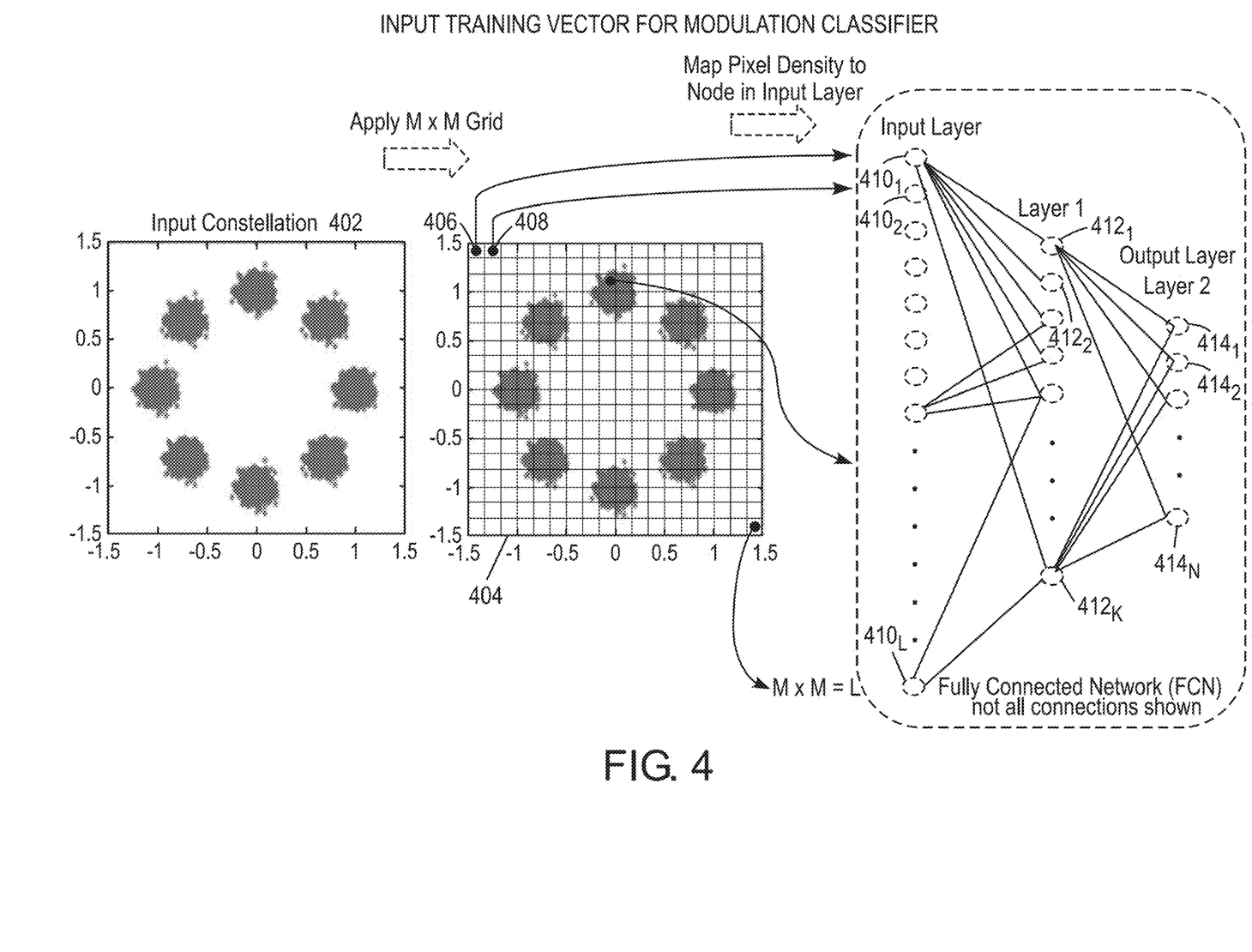
FIG. 4 illustrates formatting an input training vector for a modulation classifier according to an exemplary embodiment.

FIG. 4 illustrates an input training vector for a neural network (e.g., neural network 120) in a receiver device (e.g., receiver device 104) that functions as a modulation classifier. FIG. 4 shows an input constellation in which time domain complex samples are scaled and mapped to a 2D constellation plot 402 based on their real and imaginary components. In FIG. 4, an M-by-M grid 404 is applied to the constellation map 402. Parameter M is a design parameter. The number of pixels (=M×M) determines the size of the input layer. In FIG. 4, the density of each pixel 406, 408, etc. is mapped to the corresponding node (e.g., $410_1$, $410_2$, ..., $410_L$) in the input layer. During training of the neural network, the input layer of the neural network holds the input training vector. In FIG. 4, Layer 1 is part of the input layer, and includes nodes $412_1$, $412_2$, ..., $412_K$. In FIG. 4, Layer 2 is the output layer, and includes nodes $414_1$, $414_2$, ..., $414_N$.

An exemplary embodiment of the present disclosure is directed to a method of constructing and training a neural network 120 that is configured to process a signal. The method includes identifying a processing function (e.g., modulation classifier, timing recovery, frequency recovery, demodulation, etc.) to be performed on the RF signal by the neural network 120. The method also includes determining an optimum format for training vectors used to train the neural network 120. For example, a training vector could be randomly generated bits that are rate ½ convolutionally coded, GMSK modulated, and have gone through an additive white Gaussian noise channel at a SNR of +10 dB. The method includes determining a number of layers of the neural network 120, number of nodes per layer, the node connectivity structure, and initial weights of the neural network 120. The method includes inputting, into the neural network 120, a plurality of formatted training vectors in order to train the neural network 120 to perform the processing function on the RF signal.

In an exemplary embodiment, the method can include recording trained weights of the neural network 120 after completion of training of the neural network 120; and evaluating performance of the processing function of the neural network 120 by using the trained weights. The method can include iteratively adjusting the training vector format, the number of layers of the neural network 120, the number of nodes per layer of the neural network 120, and the node connectivity structure until desired performance of the processing function is achieved (e.g., a specific level of confidence is achieved in identifying a received signal type).

In an exemplary embodiment, the processing function is classification of a modulation scheme.

In an exemplary embodiment, the number of layers is two, but can be any number.

In an exemplary embodiment, the optimum format of the training vector includes two-dimensional constellation points with resolution based on an amount or type of distortion in a transmission channel 304 through which the RF signal can travel.

Figure 5:
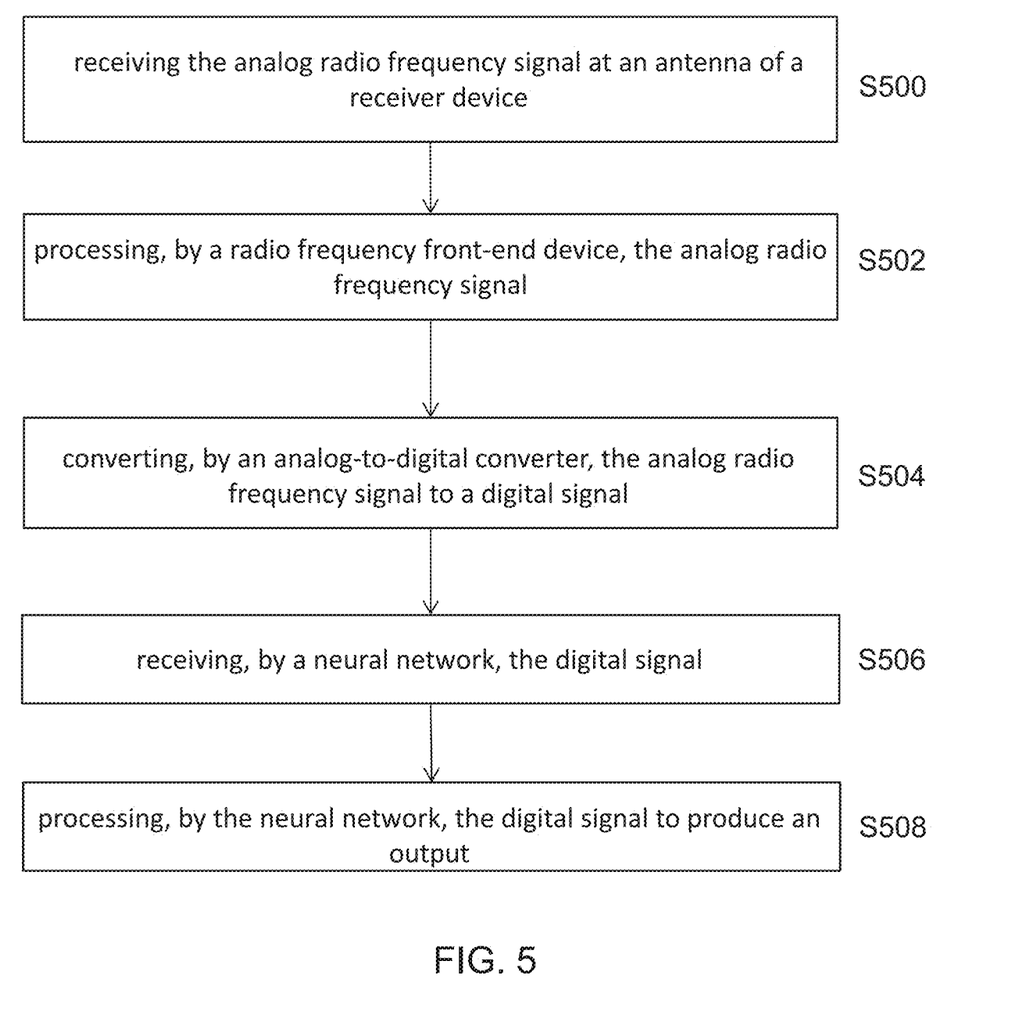
FIG. 5 is a flow chart illustrating a method according to an exemplary embodiment.

FIG. 5 illustrates a method of processing an RF signal. The method includes, in step S500, receiving the RF signal at an antenna 114 of a receiver device 104. Step S502 includes processing, by a RF front-end device 116, the RF signal. Step S504 includes converting, by an analog-to-digital converter 118, the analog RF signal to a digital signal. Step S506 includes receiving, by a neural network 120, the digital signal. Step S508 includes processing, by the neural network 120, the digital signal to produce an output.

In an exemplary embodiment, the processing can be the classifying of a modulation scheme of the digital signal, and the digital signal can be processed based on the determined classification of the modulation scheme.

In an exemplary embodiment, the RF signal received at the antenna 114 was generated by a neural network 106 in a transmitter device 102.

In an exemplary embodiment, the received RF signal is any one type among two or more types of RF signals, and the classified modulation scheme of the digital signal is unique amongst the modulation schemes of the two or more RF signals.

In an exemplary embodiment, the method can include processing the digital signal based on the determined classification of the modulation scheme.

In an exemplary embodiment, the neural network 120 is two or more neural networks connected in series or parallel.

In an exemplary embodiment, the neural network 120 has been trained by training vectors.

In an exemplary embodiment, the neural network 120 has been trained by a plurality of training vectors that include hardware impairments and distortions caused by a transmission channel 304 between the receiver device 104 and a transmitter device 102. Some radio environments, such as under water, are extremely difficult to analytically model and have extremely limited data sets available. For example, when transmitting through water, salinity, temperature, etc. affect propagation. In such environments, the target channel 304 can be modeled as a neural network that is trained to represent the channel. In this use case, the neural networks in the transmitter device 102 and receiver device 104 are jointly trained for optimum performance in the target channel 304, where the target channel 304 is represented by a trained neural network. During operations, the trained transmitter device 102 applies transformations to information bits to generate a robust signal for transmission through the channel 304. The trained receiver device 104 processes the corrupt signal and recovers the transmitted information bits with minimal errors. A signal is created that will be received the best by the receiver device 104. That is, the signal is jointly optimized by the neural network 106 in the transmitter device 102 and by the neural network 120 in the receiver device 104.

In an exemplary embodiment, the training vectors include a range of time, phase, and frequency errors, and a range of additive white Gaussian noise levels corresponding to a range of signal-to-noise ratios.

In an exemplary embodiment, the method can include performing, by the neural network 120, synchronization, channel equalization, demodulation, decoding, or other functions on the digital signal as necessary to reproduce information bits that were transmitted.

In an exemplary embodiment, the method can include performing, by the neural network 120, synchronization, channel equalization, demodulation, decoding, and other functions on the digital signal as necessary to reproduce information bits that were transmitted.

In an exemplary embodiment, the neural network 120 of the receiver device 104 and a neural network 106 of a transmitter device 102 are jointly trained for optimal performance in a particular transmission environment.

Figure 6:
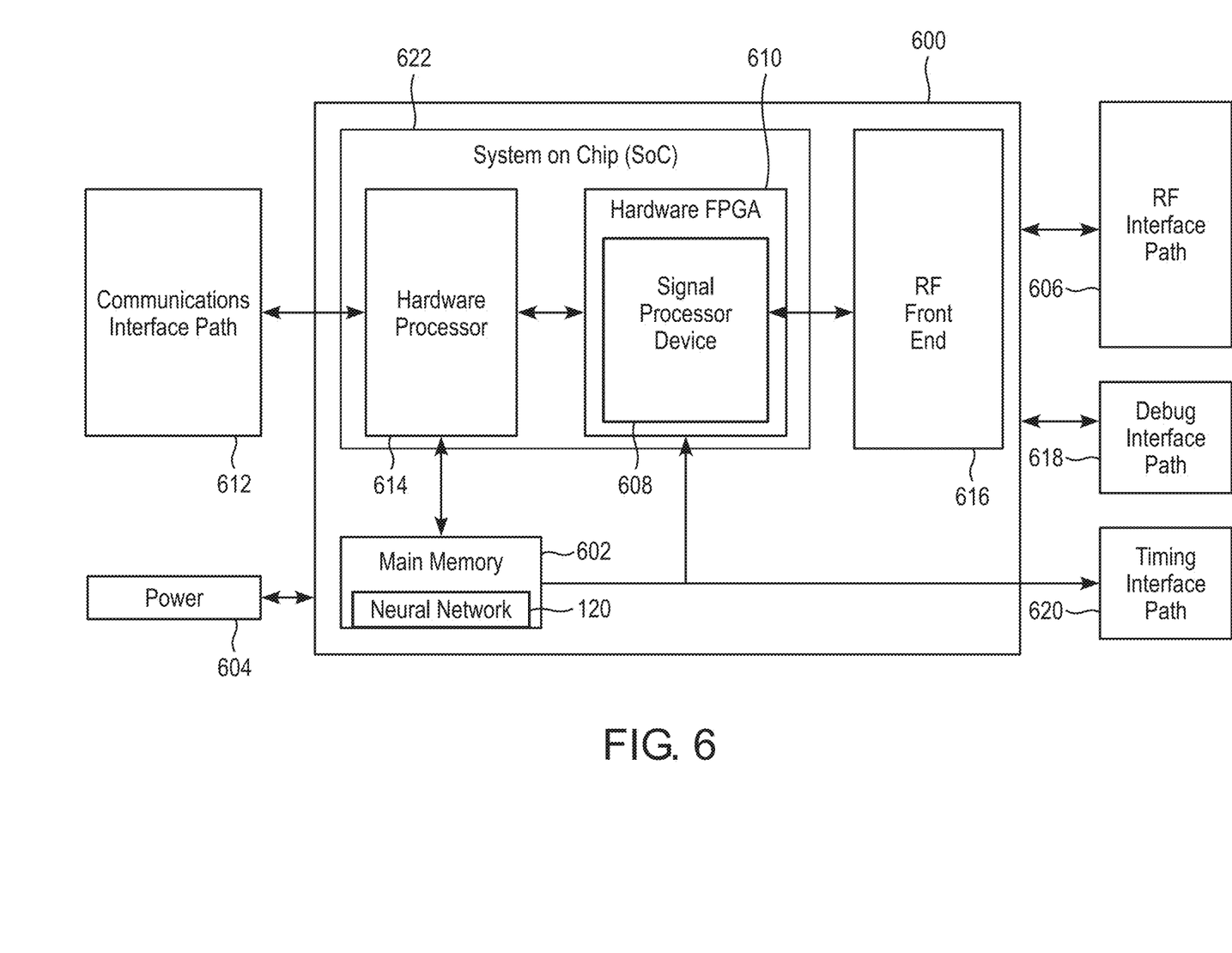
FIG. 6 is a block diagram illustrating the hardware architecture of a computing device in accordance with an exemplary embodiment.

FIG. 6 is a block diagram illustrating a computing device architecture in accordance with an exemplary embodiment that can be used to store and run the neural network 120 of the receiver device of FIG. 1. A similar computing device architecture could be used within the transmitter device 102 to store and run the neural network 106. A person having ordinary skill in the art may appreciate that embodiments of the disclosed subject matter can be practiced with various computer system configurations, including multi-core multiprocessor systems, minicomputers, mainframe computers, emulated processor architectures, computers linked or clustered with distributed functions, as well as pervasive or miniature computers that may be embedded into virtually any device. For instance, at least one processor device and a memory may be used to implement the above described embodiments.

A hardware processor device as discussed herein may be a single hardware processor, a plurality of hardware processors, or combinations thereof. Hardware processor devices may have one or more processor "cores." The term "non-transitory computer readable medium" as discussed herein is used to generally refer to tangible media such as a memory device 602. The hardware processor may or may not have an RF front-end 616 integrated with it—that is, the processing of collected data may occur either in the device with the antenna directly attached to it, or on another processor device operating on previously collected signal data.

After reading this description, it will become apparent to a person skilled in the relevant art how to implement the present disclosure using other computer systems and/or hardware architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

System on chip device 622 contains both the hardware processor 614 and the hardware FPGA 610, which can be a general purpose processor device and a special purpose device, respectively. The hardware processor device 614 may be connected to a communications infrastructure 612, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, RF, or any combination thereof. Other suitable network types and configurations will be apparent to persons having skill in the relevant art. The computing device 600 may also include a memory 602 (e.g., random access memory, read-only memory, etc.), and may also include one or more additional memories. The memory 602 and the one or more additional memories may be read from and/or written to in a well-known manner. In an embodiment, the memory 602 and the one or more additional memories may be non-transitory computer readable recording media. The signal processor device 608 resides inside the hardware FPGA 610, which may perform various signal processing functions on the digital signal.

Data stored in the computing device 600 (e.g., in the memory 602) may be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory 602.

In an exemplary embodiment, the data may be configured in any type of suitable database configuration, such as a relational database, a structured query language (SQL) database, a distributed database, an object database, etc. Suitable configurations and storage types will be apparent to persons having skill in the relevant art.

The computing device 600 may also include an RF interface path 606. The RF interface path 606 may be configured to allow software and data to be transferred between the computing device 600 and external devices. Exemplary communications interfaces 612 may include a modem, a network interface (e.g., an Ethernet card), a communications port, a PCMCIA slot and card, etc. Software and data transferred via the communications interface 612 may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a phone line, a cellular phone link, a radio frequency link, etc. The timing interface path 620 or the debug interface path 618 may be used to configure the hardware FPGA 610 to optimize the signal processor 608.

Memory semiconductors (e.g., DRAMs, etc.) may be means for providing software to the computing device 600. Computer programs (e.g., computer control logic) may be stored in the memory 602. Computer programs may also be received via the communications interface 612. Such computer programs, when executed, may enable computing device 600 to implement the present methods as discussed herein. In particular, the computer programs stored on a non-transitory computer-readable medium, when executed, may enable hardware processor device 602 to implement the functions/methods illustrated by FIGS. 2, 3A, 3B, 4, and 5, or similar methods, as discussed herein. Accordingly, such computer programs may represent controllers of the computing device 600. Where the present disclosure is implemented using software, the software may be stored in a computer program product or non-transitory computer readable medium and loaded into the computing device 600 using a removable storage drive or communications interface 612.

The computing device 600 may also include a transceiver which performs functions pertaining to analog to digital signal conversion. The computing device 600 may also include an RF front end 616 which performs RF signal processing functions on an RF signal. The computing device 600 may also contain a power device 604 which powers the device to perform its designated functions.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

What is claimed is:

1. A method of processing a radio frequency signal, comprising:
    receiving the radio frequency signal at an antenna of a receiver device;
    processing, by a radio frequency front-end device, the radio frequency signal;
    converting, by an analog-to-digital converter, the radio frequency signal to a digital signal;
    receiving, by a neural network trained to operate on a streaming radio platform, the digital signal, wherein the neural network has been trained by a plurality of training vectors that include impairments and distortions caused by a transmission channel between and including the receiver device and a transmitter device; and
    processing, by the neural network, the digital signal to produce an output by classifying a modulation scheme of the digital signal based on the plurality of training vectors.

2. The method of claim 1, wherein the radio frequency signal received at the antenna was generated by the transmitter device, which is a neural network based transmitter device.

3. The method of claim 1, wherein the received radio frequency signal is any one type among two or more types of radio frequency signals, and the classified modulation scheme of the digital signal is unique amongst the modulation schemes of the two or more radio frequency signals.

4. The method of claim 3, wherein processing the digital signal to produce an output comprises processing the digital signal based on the determined classification of a modulation scheme of the digital signal.

5. The method of claim 1, wherein the neural network is two or more neural networks connected in series or parallel.

6. The method of claim 1, wherein the training vectors include a range of time, phase and frequency errors, and a range of additive white Gaussian noise levels corresponding to a range of signal-to-noise ratios.

7. The method of claim 1, comprising:
    performing, by the neural network, synchronization, channel equalization, demodulation, decoding, or other functions on the digital signal as necessary to reproduce information bits that were transmitted.

8. The method of claim 1, comprising:
    performing, by the neural network, synchronization, channel equalization, demodulation, decoding, and other functions on the digital signal as necessary to reproduce information bits that were transmitted.

9. The method of claim 1, wherein the neural network of the receiver device and a neural network of the transmitter device are jointly trained for optimal performance in a particular transmission environment.

10. The method of claim 1, wherein the neural network is trained subject to SWaP (size, weight, and power) constraints of a receiver device of the streaming platform.

11. A receiver device configured to process a radio frequency signal, comprising:
    an antenna configured to receive the radio frequency signal;
    a radio frequency front-end device configured to process the radio frequency signal;
    an analog-to-digital converter configured to convert the radio frequency signal to a digital signal; and
    a neural network trained by a plurality of training vectors to operate on a streaming radio platform, the training vectors including impairments and distortions caused by a transmission channel between and including the receiver device and a transmitter device, the neural network being configured to receive the digital signal and process the digital signal by classifying a modulation scheme of the digital signal based on the training vectors, and produce an output based on the determined classification of the modulation scheme.

12. The receiver device of claim 11, wherein the radio frequency signal received at the antenna was generated by the transmitter device, which is a neural network based transmitter device.

13. The receiver device of claim 11, wherein the received radio frequency signal is any one type among two or more types of radio frequency signals, and the classified modulation scheme of the digital signal is unique amongst the modulation schemes of the two or more radio frequency signals.

14. The receiver device of claim 11, wherein the neural network is configured to process the digital signal based on a determined classification of a modulation scheme of the digital signal.

15. The receiver device of claim 11, wherein the neural network is trained subject to SWaP constraints of the receiver device.

* * * * *